(12) United States Patent
Basa et al.

(10) Patent No.: US 12,300,112 B2
(45) Date of Patent: May 13, 2025

(54) PRE-DEPARTURE SEQUENCING USING MULTI-AGENT REINFORCEMENT LEARNING

(71) Applicant: ARINC Incorporated, Annapolis, MD (US)

(72) Inventors: Jnana Vamsi Kumar Basa, Anaparthi (IN); Rohit Chandrahas, Kozhikode (IN); Shivang Tyagi, Bengaluru (IN)

(73) Assignee: ARINC Incorporated, Annapolis, MD (US)

( * ) Notice: Subject to any disclaimer, the term of this patent is extended or adjusted under 35 U.S.C. 154(b) by 197 days.

(21) Appl. No.: 18/222,817

(22) Filed: Jul. 17, 2023

(65) Prior Publication Data

US 2024/0169846 A1 May 23, 2024

(30) Foreign Application Priority Data

Nov. 19, 2022 (IN) .............................. 202211066536

(51) Int. Cl.
*G08G 5/20* (2025.01)
*G06N 3/092* (2023.01)
*G08G 5/56* (2025.01)

(52) U.S. Cl.
CPC .............. *G08G 5/56* (2025.01); *G06N 3/092* (2023.01); *G08G 5/20* (2025.01)

(58) Field of Classification Search
CPC ............. G08G 5/56; G08G 5/20; G06N 3/092
See application file for complete search history.

(56) References Cited

U.S. PATENT DOCUMENTS

| 8,566,016 | B2 | 10/2013 | Law et al. |
| 10,210,766 | B2 | 2/2019 | Ince et al. |
| 2012/0158441 | A9 | 6/2012 | Kane |
| 2020/0184725 | A1 | 6/2020 | Venugopalan |
| 2020/0290742 | A1 | 9/2020 | Kumar et al. |
| 2021/0125511 | A1 | 4/2021 | Sinha et al. |

FOREIGN PATENT DOCUMENTS

| CN | 1728173 A | 2/2006 |
| EP | 4050584 A1 | 8/2022 |
| WO | 2011156027 A1 | 12/2011 |

OTHER PUBLICATIONS

Ali Hasnain et al. "A Deep Reinforcement Learning Approach for Airport Departure Metering Under Spatial-Temporal Airside Interactions", IEEE Transactions on Intelligent Transportation Systems, Piscataway, NJ vol. 23, No. 12, Dec. 1, 2022, pp. 23833-23950.

(Continued)

*Primary Examiner* — Mathew Franklin Gordon
(74) *Attorney, Agent, or Firm* — Suiter Swantz IP (57) ABSTRACT

A system and method for optimizing pre-departure sequencing instantiates independent agent processes for each aircraft. Each independent agent is trained via multi-agent reinforcement machine learning with an existing set of data to maximize that agent's individual reward within established bounds and while cooperating with each other agent. The interaction of the independent agents produces an optimized pre-departure sequence. The individual reward is defined with respect to a change between the current timestamp and the newly suggested timestamp. A lower delta results in a higher reward.

20 Claims, 6 Drawing Sheets

(56) References Cited

OTHER PUBLICATIONS

Ali Hasnain et al. "Deep Reinforcement Learning Based Airport Departure Metering", 2021 IEEE International Intelligent Transportation Systems Conference (ITSC), Sep. 19, 2021, pp. 366-371.
Extended European Search Report dated Apr. 3, 2024; European Application No. 232102004
Yang Yongjian et al. "Multiagent Reinforcement Learning-Based Taxi Predispatching Model to Balance Taxi Supply and Demand", Journal of Advanced Transportation, vol. 2020, Feb. 19, 2020, pp. 1-12.

PRE-DEPARTURE SEQUENCING USING MULTI-AGENT REINFORCEMENT LEARNING

PRIORITY

The present application claims the benefit under 35 U.S.C. § 119(a) of Indian Patent App. No. 202211066536 (filed Nov. 19, 2022), which is incorporated herein by reference.

BACKGROUND

Aircraft delays are common at busy airports, and the aircraft are frequently queued at holding points. Airports are working to optimize operating efficiency and throughput, and minimize congestion on taxi ways. Airport Collaborative Decision Making (A-CDM) is a standardized airport operations management method that optimizes resource utilization and improves air traffic predictability. For an airport to become A-CDM compliant, it must implement pre-departure sequencing. In most situations today, the air traffic management applies the principle of "first come first served" that often leads to queuing near the runway threshold with corresponding long wait times and high fuel consumption. Aircraft are often queued based on Target Takeoff Time (TTOT), airport holding point threshold values, and runway capacity. Existing routing systems cause high taxiway/runway congestion, high fuel burn with corresponding carbon emissions, reduced airport capacity, high turnaround time, inefficient ramp utilization, and inflexibility in the face of adverse conditions. It is imperative that terminal-area operations, particularly airport ground operations, are planned safely and efficiently to meet expected increases in demand.

SUMMARY

In one aspect, embodiments of the inventive concepts disclosed herein are directed to a system and method that instantiates independent agent processes for each aircraft in a pre-departure sequence. Each independent agent is trained via multi-agent reinforcement machine learning with an existing set of data to maximize that agent's individual reward within established bounds and while cooperating with each other agent. The interaction of the independent agents produces an optimized pre-departure sequence.

In a further aspect, the individual reward is defined with respect to a change between the current timestamp and the newly suggested timestamp. A lower delta results in a higher reward.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method that instantiates independent agent processes for each aircraft in a pre-departure sequence. Each independent agent is trained via multi-agent reinforcement machine learning with an existing set of data to maximize that agent's individual reward within established bounds and while cooperating with each other agent. The interaction of the independent agents produces an optimized pre-departure sequence. The individual reward is defined with respect to a change between the current timestamp and the newly suggested timestamp. A lower delta results in a higher reward.

Pre-departure sequencing is one of six concept elements that must be implemented sequentially according to A-CDM. Takeoff and startup approval times are important milestones in pre-Departure Sequencing. When there is a simultaneous takeoff/landings of several aircraft, they queue up at the holding point.

Figure 1:
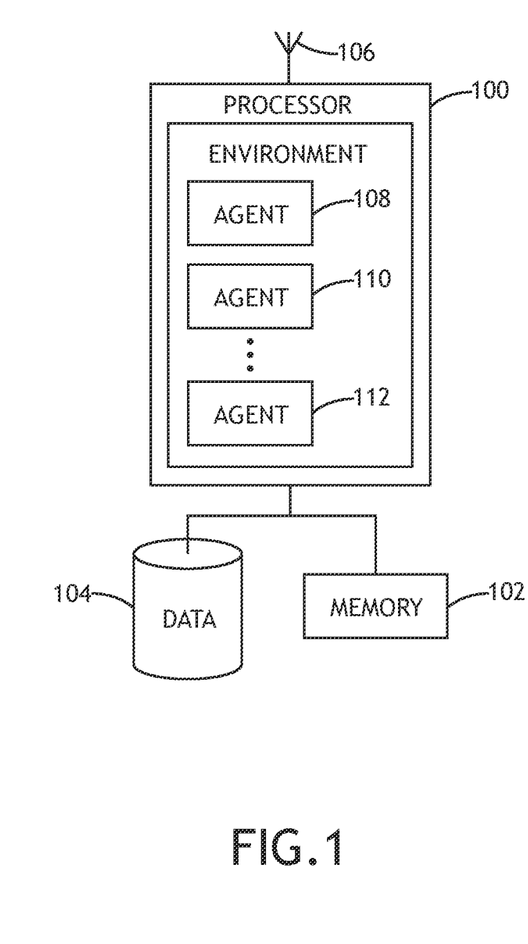
FIG. 1 shows a block diagram view of a system for pre-departure sequencing according to an exemplary embodiment.

Referring to FIG. 1, a block diagram view of a system for pre-departure sequencing according to an exemplary embodiment is shown. The system includes a processor 100, memory 102 connected to the processor 100 for embodying processor executable code, a data storage device 104 connected to the processor 100, and a data communication device 106 connected to the processor 100. In at least one embodiment, the data storage device 104 may store historical data for training a multi-agent reinforcement machine learning algorithm to enable independent agents 108, 110, 112 to make independent sequencing decisions as more fully described herein. In at least one embodiment, the data storage device 104 may store data pertaining to specific aircraft associated with the independent agents 108, 110, 112 including a current state of the aircraft, airport facilities, aircraft schedules, etc.

In at least one embodiment, each independent agent 108, 110, 112 is configured to receive data from the data storage device and the data communication device 106. Each independent agent 108, 110, 112 processes the data via a trained artificial intelligence, and communicates with each other independent agent 108, 110, 112 to propose a pre-departure sequence. Each independent agent 108, 110, 112 produces a proposed pre-departure sequence to maximize that agent's 108, 110, 112 "reward" as defined by the artificial intelligence, with a solution comprising a pre-departure sequence resulting in the maximum total reward for all independent agents 108, 110, 112. The solution is then communicated to the aircraft via air traffic control. The solution may define target engine startup approval time (TSAT) and departing runway for each aircraft.

In at least one embodiment, the independent agents 108, 110, 112 are trained via multi-agent reinforcement learning to optimize the pre-departure sequence and perform runway allocation. The independent agents 108, 110, 112 may be trained using data including factors such as aircraft size, runway orientation and capacity, separation times, arriving aircraft, ground conditions, weather conditions, etc. The independent agent reward may be dependent on the change between the newly suggested and existing timestamp with a lower delta resulting in a higher reward. In at least one embodiment, the algorithm is trained on Historical data made available by external sources such as FlightAware, AirPlan/AODB, ADS-B sent through industry standard AIDX messaging system, etc. In at least one embodiment, the solution can be deployed in an airport moving map (AMM) system that provides pilots optimized taxi routing, obstacles awareness, and real-time traffic of surrounding aircraft. In at least one embodiment, runways are allocated according to factors such as departure direction, aircraft size, and weather conditions to further optimize airport operations.

In at least one embodiment, the processor 100 is configured to simulate the airport environment based on airport data from the data storage device 106 and weather conditions received via the data communication device 106. Each independent agents 108, 110, 112 is instantiated by the processor 100 to a specific aircraft.

Figure 2:
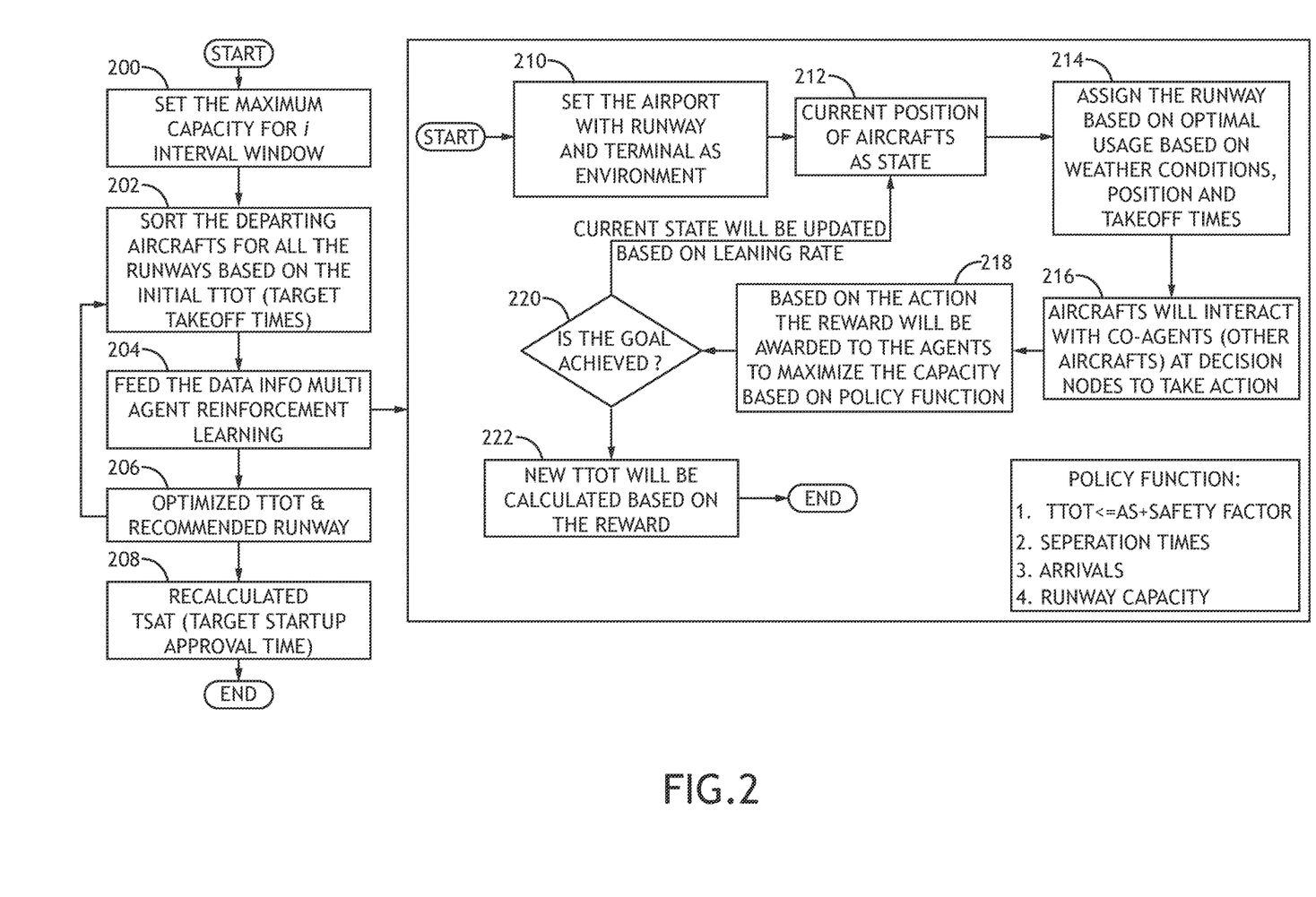
FIG. 2 shows a flowchart of a method for pre-departure sequencing according to an exemplary embodiment.

Referring to FIG. 2, a flowchart of a method for pre-departure sequencing according to an exemplary embodiment is shown. A system establishing a pre-departure sequence sets 200 or retrieves a maximum capacity for an interval window, and sorts 202 departing aircraft for all runways based on initial target takeoff times. The system then instantiates an independent agent for each aircraft and supplies 204 data to each independent agent to execute a trained multi-agent reinforcement machine learning algorithm; optimized target takeoff times are produced 206 and may be fed back to the initial target takeoff time for subsequent sorting 202 steps. Based on the produced 206 optimized target takeoff times, the system may recalculate 208 target startup approval times for each aircraft to conform to the optimized target takeoff times.

In at least one embodiment, the trained multi-agent reinforcement machine learning algorithm sets 210 a local airport as the environment, including the layouts of runways, taxiways, and terminals. For each independent agent, the current position of the aircraft is recorded 212 as an initial state, and a runway is assigned 214 for use based on weather conditions, aircraft capabilities, the initial state, takeoff times, etc. The system allows each independent agent to interact 216 at decision nodes; each independent agent is trained to determine some action for the aircraft. Based on the determined actions, each independent agent receives 218 a reward; the reward is defined by some metric or set of metrics to maximize airport capacity. The system then determines 220 if a predefined goal is achieved (i.e., a threshold aircraft capacity, accommodating all aircraft takeoff times, etc.), new target takeoff times are calculated 222; otherwise updated current positions are recorded 212 and the process continues.

In at least one embodiment, the reward metric is defined by factors including a minimum change in target takeoff time plus some predefined takeoff factor (i.e., smaller modifications to target takeoff times result in higher rewards), separation times, arrivals, runway capacity, etc. It may be appreciated at each step, the current state of each independent agent is considered.

Figure 3:
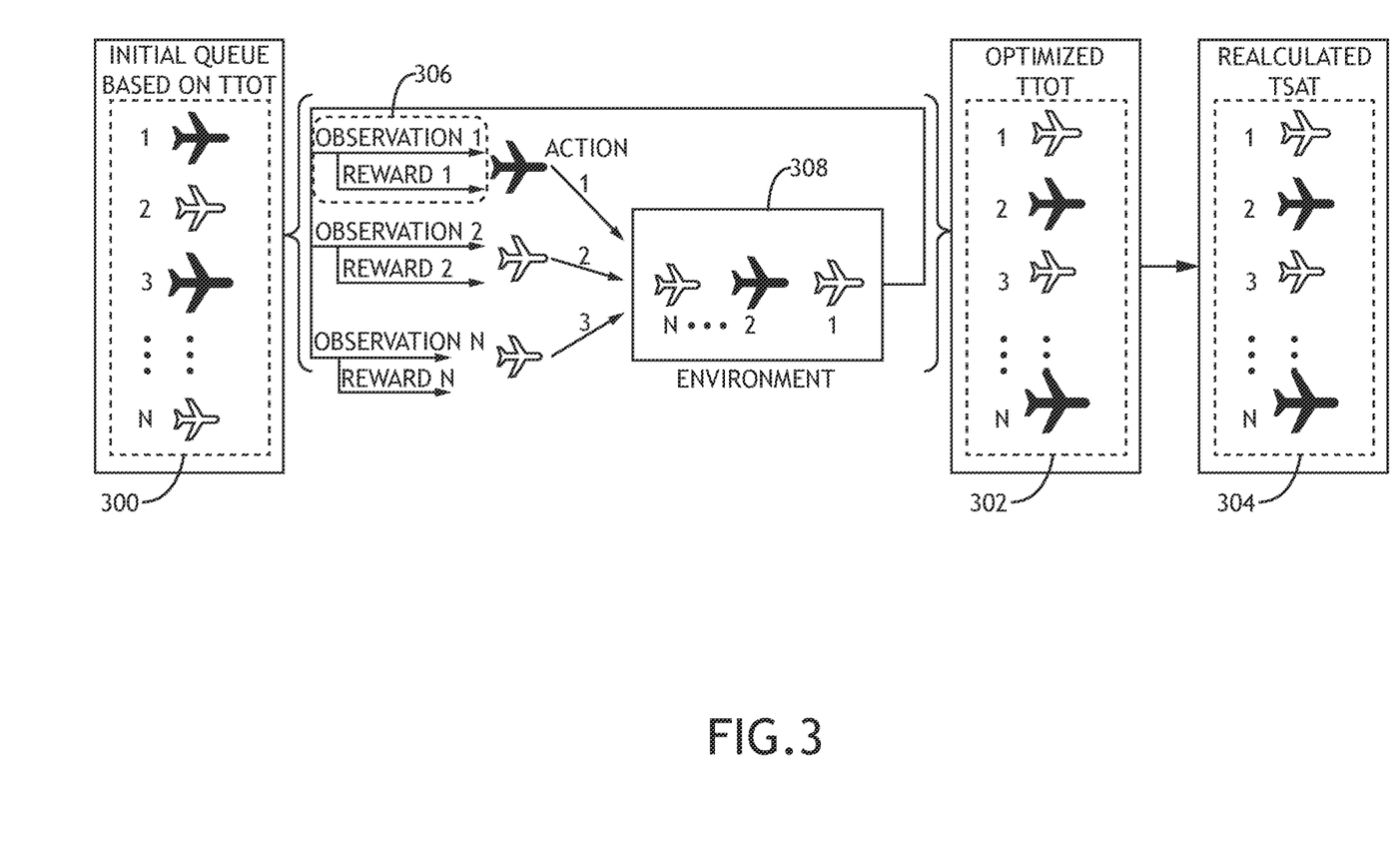
FIG. 3 shows a block representation of an exemplary embodiment.

Referring to FIG. 3, a block representation of an exemplary embodiment is shown. A system performing pre-departure sequencing sorts departing aircraft for all runways based on an initial target takeoff time to produce an initial queue 300 for flights within some interval window of time. The number of flights considered (and interval window) may be based on the maximum runway and stand capacities and will vary from airport to airport.

The system than instantiates independent agents and the independent agents iteratively interact to select runways, taxiways, aircraft order, etc. The independent agents may consider various factors to self-arrange in an optimal order 302; the various factors may include weather conditions, aircraft characteristics, etc. In at least one embodiment, after the earliest departure is determined, that aircraft may be removed and the next flight in queue is added and a similar optimization is done. This is repeated for the whole queue.

Once an optimized order 302 is generated, the system may calculate target startup approval times 304 for the aircraft based on the optimized order 302.

Figure 4:
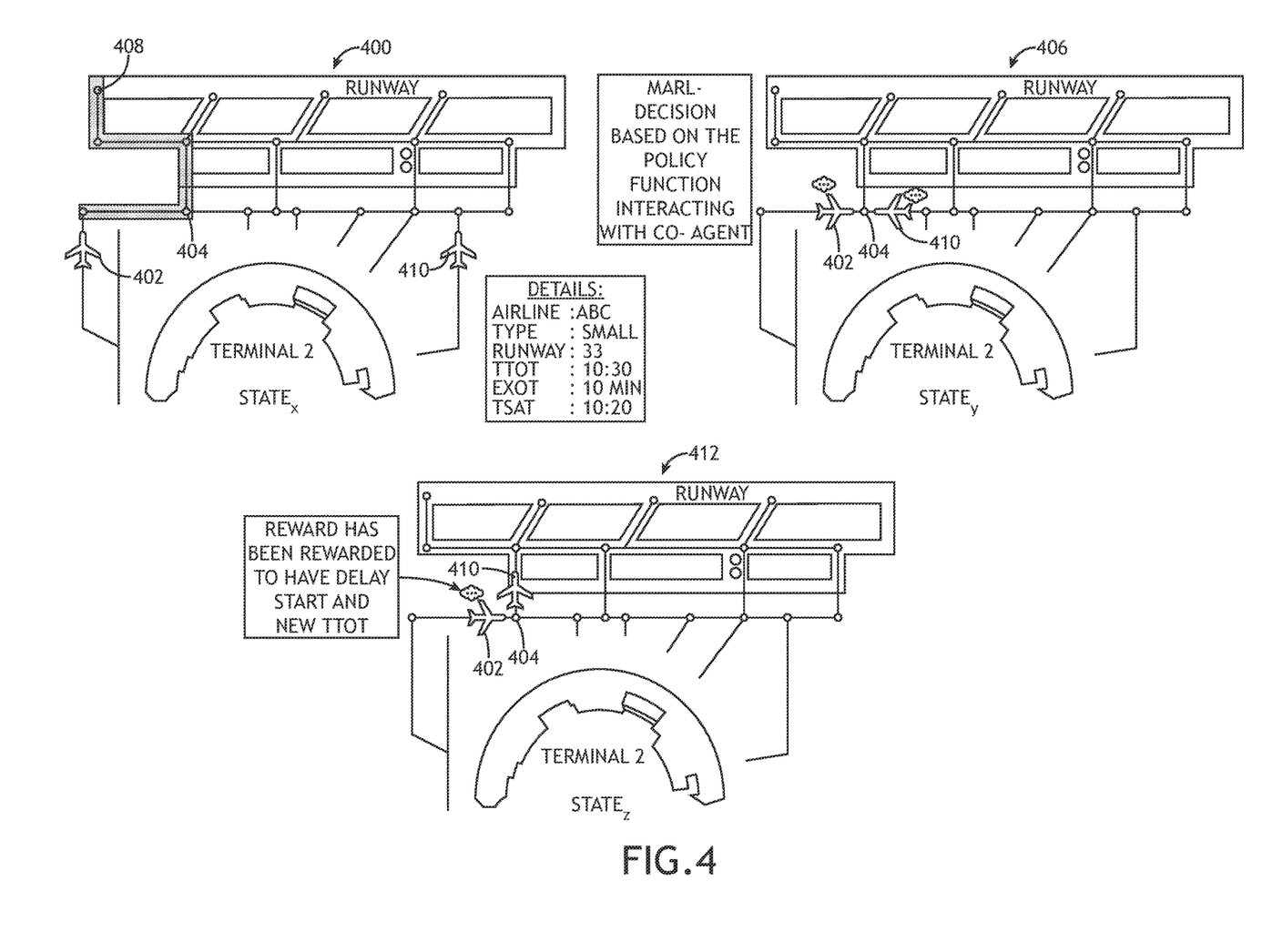
FIG. 4 shows block representations of aircraft taxing according to an exemplary embodiment.

Referring to FIG. 4, block representations of aircraft taxing according to an exemplary embodiment are shown. A system performing pre-departure sequencing embodies a simulation of an entire airport as the environment 400, 406, 412. The system instantiates a plurality of independent agents 402, 410, each corresponding to an aircraft in the environment 400, 406, 412. The state of each independent agent 402, 410 changes dynamically based on its location and active independent agents 402, 410 at each node 404. The states of the independent agents 402, 410 are periodically updated based on their respective positions.

Each independent agent 402, 410 is required to make decisions at each node 404 on the path. In at least one embodiment, these decisions depend on, and influence, the upcoming and previous decisions of the independent agent 402, 410, and of other active independent agents 402, 410. The various paths and decisions at each node that the agent can take are the available "actions".

In at least one embodiment, the system employs multi-agent reinforcement learning. The reward is dependent on the policy, and the policy is determined by various factors such as runway capacity, arrivals, weather conditions, departure direction, existing target takeoff times, separation times, etc. The goal of each independent agent 402, 410 is to maximize the reward based on the policy.

In at least one embodiment, runway allocation is performed prior to pre-departure sequencing. Runways are allocated based on factors such as separation time, weather condition, take-off time, departure direction, runway capacity, and distance from the stand, giving the most optimized runway for each aircraft.

After runway allocation and pre-departure sequencing are optimized for the entire sequence, new modified target startup approval times are produced and provided to each aircraft corresponding to the independent agents 402, 410.

In one exemplary embodiment, at a first time in the simulated environment 400, a first aircraft agent 402 and a second aircraft agent 410 are each allocated the same runway. Furthermore, each aircraft agent 402, 410 may reference the same target takeoff time and target startup approval time.

At a second time in the simulated environment 406, each aircraft agent 402, 410 is predicted to approach a node 404 wherein some decision/action must be taken. At that point, the aircraft agents 402, 410 interact to determine all available actions, and each aircraft agent 402, 410 identifies the action that maximizes its own reward. In at least one embodiment, the system may also consider total rewards for all interacting aircraft agents 402, 410. At a third time in the simulated environment 412, the first aircraft agent 402 has maximized its reward by delaying in favor of the second aircraft agent 410 at the node 404, resulting in a delay to the target takeoff time for that aircraft.

Once actions are determined for all aircraft agents 402, 410 at all nodes 404, the system may calculate new target startup approval times based on those decisions, and provide those times to the actual aircraft. It may be appreciated that the aircraft agents 402, 410 may transit one or more nodes without interacting with any other aircraft agents 402, 410, but that decisions/actions may be determined for each of those nodes.

Figure 5:
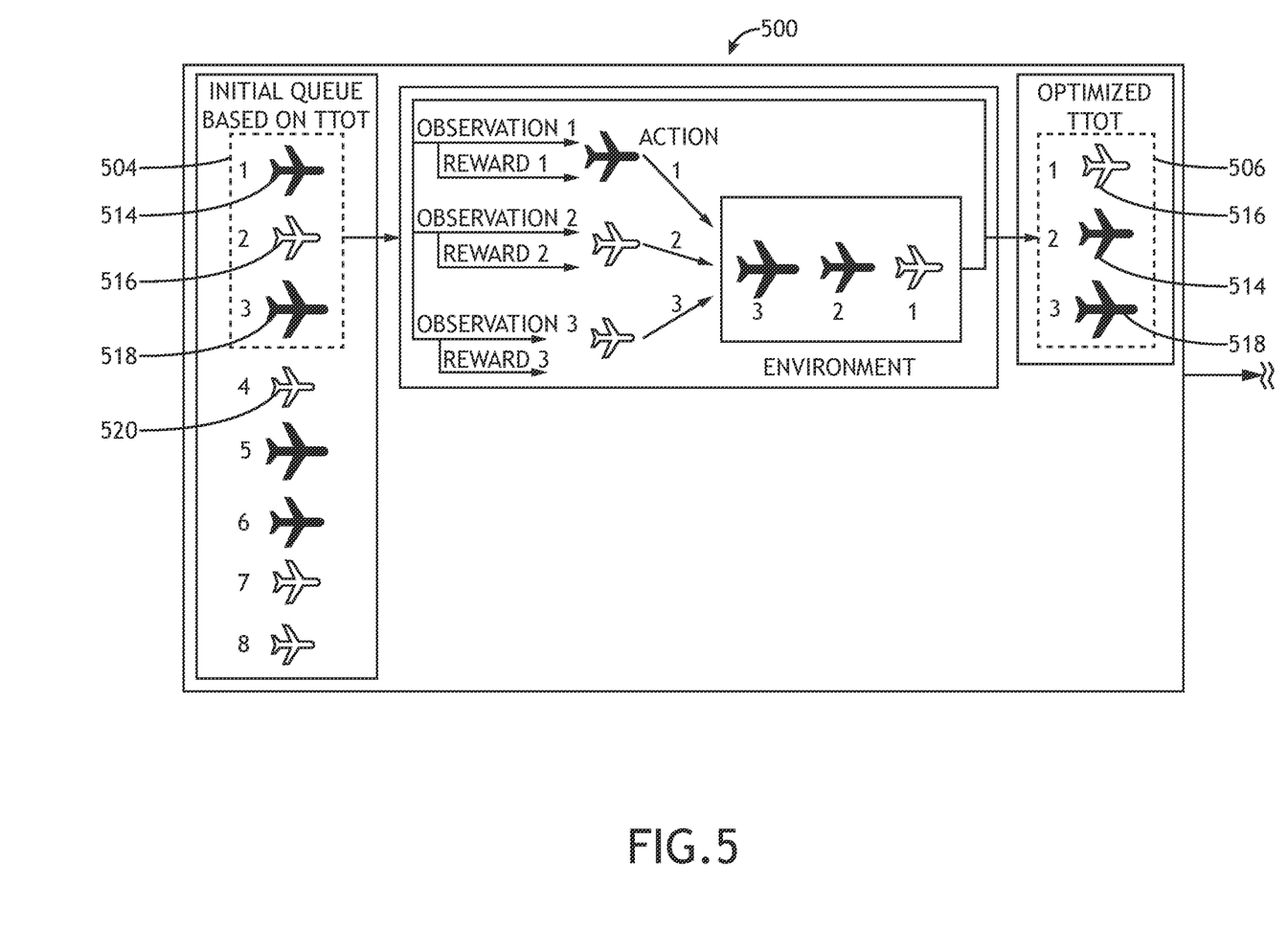
FIG. 5 shows a block representation of an exemplary embodiment.

Referring to FIG. 5, a block representation of an exemplary embodiment is shown. A system performing pre-departure sequencing performs a first iterative optimization 500. The system defines a first interval window 504 including a first set of aircraft agents 514, 516, 518 ordered according to initial target takeoff times. The system executes a simulation including the airport environment, wherein each of the first set of aircraft agents 514, 516, 518 interact. All the aircraft agents 514, 516, 518 interact to maximize individual rewards based on a set policy to produce an optimized sequence 506.

In at least one embodiment, each aircraft agent 514, 516, 518 considers all the possible paths that it can take to get to the runway; if multiple aircraft agents 514, 516, 518 have overlapping paths, the path with the least overlap is chosen by both aircraft agents 54, 516, 518. The priority of passage at any point between multiple aircraft agents 514, 516, 518 depends on the aircraft target takeoff time and separation times.

In at least one embodiment, once the optimized sequence 506 for the first iterative optimization 500 is produced, the first aircraft agent 516 in the optimized sequence 506 is fixed and a second iterative optimization 502 begins. In the second iterative optimization, one or more additional aircraft agents 520 are added to the process. Interval windows 514, 510 for the second iterative optimization 502 may be defined to remove the first aircraft agent 516 from consideration as the first aircraft agent 516 is fixed in the optimized sequence 506.

In at least one embodiment, the second iterative optimization 502 produces an updated optimized sequence 512 including all of the aircraft agents 514, 516, 518, 520 processed so far, and the first aircraft agent 516, and second aircraft agent 520 are both fixed. The system continues to iteratively add the next marginal aircraft agent(s) in subsequent iterative optimization steps until all aircraft agents 514, 516, 518, 520 are included in the optimized sequence 506, 512. The system may then produce new target takeoff times for each aircraft agent 514, 516, 518, 520 in the optimized sequence 506, 512 and provide those times to the corresponding aircraft.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least one processor in data communication with a data communication device, a data storage device, and a memory storing processor executable code for configuring the at least one processor to:
   retrieve an airport model from the data storage device; the airport model defining at least one or more runways, one or more taxiways, and one or more nodes;

instantiate a plurality of independent aircraft agents, each defining one or more aircraft characteristics and an initial target takeoff time;

simulate a departure sequence of each independent aircraft agent within the airport model based on the initial takeoff times;

determine that two or more independent aircraft agents have converged at a node;

execute a decision-making process in each of the two or more independent aircraft agents to determine an action for each of the two or more independent aircraft agents;

adjust one or more initial target takeoff times based on the determined actions; and provide the adjusted target takeoff times to aircraft corresponding to the two or more independent aircraft agents via the data communication device.

2. The computer apparatus of claim 1, wherein the decision-making process comprises a trained, multi-agent reinforcement machine learning algorithm.

3. The computer apparatus of claim 2, wherein the multi-agent reinforcement machine learning algorithm defines a decision reward at least partially based on a deviation between the initial target takeoff time and the adjusted target takeoff time.

4. The computer apparatus of claim 3, wherein the decision-making process comprises each of the two or more independent aircraft agents maximizing that independent agent's reward.

5. The computer apparatus of claim 1, wherein the at least one processor is further configured to iteratively execute decision-making processes until each of the plurality of independent aircraft agents is placed in an optimized pre-departure sequence.

6. The computer apparatus of claim 5, wherein the at least one processor is further configured to segregate the plurality of independent aircraft agents into interval windows based on the initial target takeoff times.

7. The computer apparatus of claim 6, wherein the at least one processor is further configured to:

iteratively fix a first independent aircraft agent in the optimized pre-departure sequence, and add a next marginal independent aircraft agent to the two or more independent aircraft agents during a subsequent iteration.

8. A method comprising:

retrieving an airport model; the airport model defining at least one or more runways, one or more taxiways, and one or more nodes;

instantiating a plurality of independent aircraft agents, each defining one or more aircraft characteristics and an initial target takeoff time;

simulating a departure sequence of each independent aircraft agent within the airport model based on the initial takeoff times;

determining that two or more independent aircraft agents have converged at a node;

executing a decision-making process in each of the two or more independent aircraft agents to determine an action for each of the two or more independent aircraft agents;

adjusting one or more initial target takeoff times based on the determined actions; and providing the adjusted target takeoff times to aircraft corresponding to the two or more independent aircraft agents via the data communication device.

9. The method claim 8, wherein the decision-making process comprises a trained, multi-agent reinforcement machine learning algorithm.

10. The method claim 9, wherein the multi-agent reinforcement machine learning algorithm defines a decision reward at least partially based on a deviation between the initial target takeoff time and the adjusted target takeoff time.

11. The method claim 10, wherein the decision-making process comprises each of the two or more independent aircraft agents maximizing that independent agent's reward.

12. The method claim 8, further comprising iteratively executing decision-making processes until each of the plurality of independent aircraft agents is placed in an optimized pre-departure sequence.

13. The method claim 12, further comprising segregating the plurality of independent aircraft agents into interval windows based on the initial target takeoff times.

14. The method claim 13, further comprising: iteratively fixing a first independent aircraft agent in the optimized pre-departure sequence, and add a next marginal independent aircraft agent to the two or more independent aircraft agents during a subsequent iteration.

15. An airport moving maps system comprising:

a data communication device;

a data storage device; and at least one processor in data communication with the data communication device, the data storage device, and a memory storing processor executable code for configuring the at least one processor to:

retrieve an airport model from the data storage device; the airport model defining at least one or more runways, one or more taxiways, and one or more nodes;

instantiate a plurality of independent aircraft agents, each defining one or more aircraft characteristics and an initial target takeoff time;

simulate a departure sequence of each independent aircraft agent within the airport model based on the initial takeoff times;

determine that two or more independent aircraft agents have converged at a node;

execute a decision-making process in each of the two or more independent aircraft agents to determine an action for each of the two or more independent aircraft agents;

adjust one or more initial target takeoff times based on the determined actions; and provide the adjusted target takeoff times to aircraft corresponding to the two or more independent aircraft agents via the data communication device.

16. The airport moving maps system of claim 15, wherein the decision-making process comprises a trained, multi-agent reinforcement machine learning algorithm.

17. The system of claim 16, wherein the multi-agent reinforcement machine learning algorithm defines a decision reward at least partially based on a deviation between the initial target takeoff time and the adjusted target takeoff time.

18. The airport moving maps system of claim 17, wherein the decision-making process comprises each of the two or more independent aircraft agents maximizing that independent agent's reward.

19. The airport moving maps system of claim 15, wherein the at least one processor is further configured to iteratively execute decision-making processes until each of the plurality of independent aircraft agents is placed in an optimized pre-departure sequence.

20. The airport moving maps system of claim 19, wherein the at least one processor is further configured to segregate the plurality of independent aircraft agents into interval windows based on the initial target takeoff times.

* * * * *